(12) United States Patent
Shen et al.

(10) Patent No.: US 10,594,407 B2
(45) Date of Patent: Mar. 17, 2020

(54) SYSTEM FOR OPTICAL LINEAR SAMPLING AND COHERENT DETECTION OF AN OPTICAL SIGNAL

(71) Applicant: Alcatel Lucent, Nozay (FR)

(72) Inventors: Alexandre Shen, Palaiseau (FR); Jean-Guy Provost, Palaiseau (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/073,106

(22) PCT Filed: Jan. 27, 2017

(86) PCT No.: PCT/EP2017/051792
§ 371 (c)(1),
(2) Date: Jul. 26, 2018

(87) PCT Pub. No.: WO2017/129755
PCT Pub. Date: Aug. 3, 2017

(65) Prior Publication Data
US 2019/0036612 A1    Jan. 31, 2019

(30) Foreign Application Priority Data
Jan. 27, 2016  (EP) .................................... 16305074

(51) Int. Cl.
*H04B 10/61* (2013.01)
*H04B 10/64* (2013.01)
(Continued)

(52) U.S. Cl.
CPC ............ *H04B 10/614* (2013.01); *G01J 11/00* (2013.01); *G02F 1/21* (2013.01); *H04B 10/615* (2013.01);
(Continued)

(58) Field of Classification Search
CPC .............................. H04B 10/614; H04B 10/64
See application file for complete search history.

(56) References Cited

U.S. PATENT DOCUMENTS

2005/0185255 A1    8/2005  Doerr et al.
2010/0215357 A1    8/2010  Westlund et al.
(Continued)

FOREIGN PATENT DOCUMENTS

EP    2 709 295 A1    3/2014

OTHER PUBLICATIONS

International Search Report for PCT/EP2017/051792 dated Mar. 10, 2017.

*Primary Examiner* — Shi K Li
(74) *Attorney, Agent, or Firm* — Fay Sharpe

(57) ABSTRACT

A system for optical linear sampling and coherent detection of an optical signal OS comprises a source emitting a pulsed optical signal SP and an optical coupler that splits the pulsed optical signal SP into two replicas, the first replica of the pulsed optical signal SP is sent to a first optical hybrid circuit and the second replica of the pulsed optical signal SP is send to a second optical hybrid circuit, a source emitting an optical signal OS and optical coupler that splits the incoming optical signal OS into two replicas, the first replica of the incoming optical signal OS is sent to the first optical hybrid circuit and the second replica of the incoming optical signal OS is sent to a wavelength recovery device WVLR, whose output is a continuous-waveform optical signal CW at the central wavelength of the incoming optical signal OS, which sends it to the second optical hybrid circuit. such that the optical signal OS is sampled within the first hybrid circuit and the continuous waveform optical signal CW is sampled in the second hybrid circuit, and a device BDADC comprising balanced photodectors detecting optical signals at the
(Continued)

Figure 1:
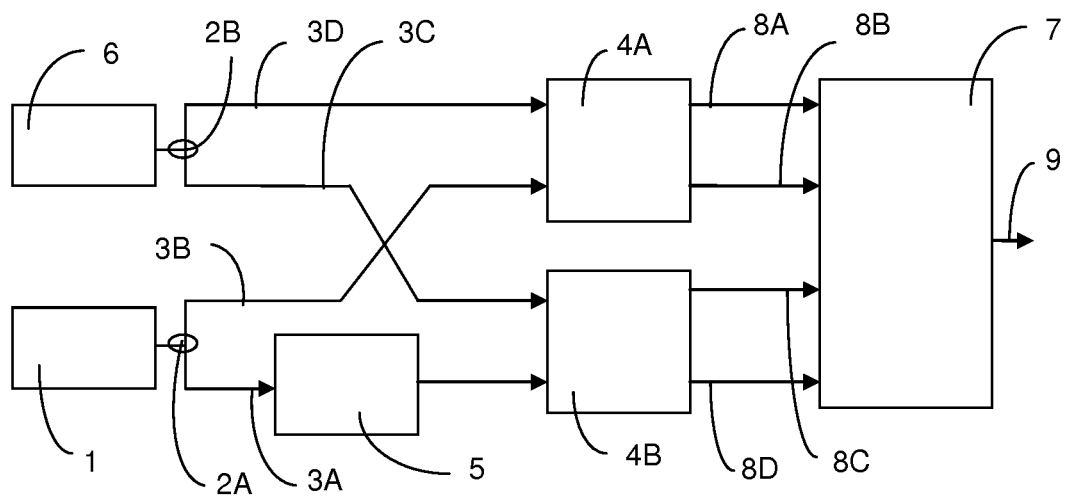

output of the two optical hybrid circuits and an analog/digital converter ADC.

12 Claims, 5 Drawing Sheets

(51) Int. Cl.
*G01J 11/00* (2006.01)
*G02F 1/21* (2006.01)

(52) U.S. Cl.
CPC .. *G02F 2001/212* (2013.01); *G02F 2001/213* (2013.01)

(56) References Cited

U.S. PATENT DOCUMENTS

2010/0266291 A1* 10/2010 Boffi ................ H04B 10/61
                                                        398/159
2014/0356003 A1* 12/2014 Randel ............... H04B 10/6161
                                                        398/210
2015/0249505 A1   9/2015 Provost et al.
2016/0065314 A1* 3/2016 Nazarathy .......... H04B 10/6151
                                                        398/202

* cited by examiner

SYSTEM FOR OPTICAL LINEAR SAMPLING AND COHERENT DETECTION OF AN OPTICAL SIGNAL

FIELD

The present invention pertains to the field of optical network telecommunications, and more specifically to systems for linear optical sampling or coherent detection of complex optical signals, at high speed and with advanced encoding formats, which are used in diagnostic and surveillance equipment.

BACKGROUND

A high-quality optical local oscillator OLO or a high-quality optical signal are necessary in methods or devices used for optical linear sampling OLS. The quality of the optical local oscillator OLO and the optical signal may be measured in terms of optical spectral line width. The quality of such an optical signal may also be measured in an equivalent fashion by its coherence time. The best-quality optical signals have a narrower line width or a longer coherence time. Although it is possible to implement a high-quality optical local oscillator (with greater costs), the input optical signal has no reason to be high-quality, because most of the time the optical signal OS, which the OLS systems must measure, is unknown.

One possible route is improving OLS systems such that the poor quality of the input optical signal no longer has any impact on the resulting output optical signal.

A known first solution consists of duplicating the layout of the OLS system by introducing a one-bit delay between the optical signal entering the original OLS system and the optical signal entering the duplicate system. One of the main drawbacks of the solution is that the one-bit delay must be readjusted to the binary bitrate of the input optical signal. This therefore limits its practical application, unless automated detection of the binary bitrate is implemented, and the one-bit delay is automatically readjusted.

Another known solution is based on simultaneous optical linear sampling of a continuous optical signal or CW (for "Continuous Waveform") signal and of a modulated optical signal which has been obtained from that incoming CW optical signal. The measurement is carried out such that the two optical linear sampling efforts also require a duplication of the OLS system. However, in this solution, no readjustment of the delay is performed. The primary drawback of this solution is that it is not appropriate for measurement of any unknown input optical signal by the OLS technique, because the modulated optical signal is produced within the experimental device. However, the solution is highly robust with respect to the respective quality of the modulated optical signal or the pulsed optical signals of the sampling.

SUMMARY

The goal of the proposed solution is to eliminate the aforementioned drawbacks, namely the need to have a one-bit optical delay adjustable with the bitrate of the input signal for the first solution, or the inability to measure unknown signals for the other station.

The subject matter of the present invention is a system for optical linear sampling and coherent detection of an optical signal OS comprising a source emitting a pulsed optical signal SP and an optical coupler that splits the pulsed optical signal SP into two replicas, the first replica of the pulsed optical signal SP is sent to a first optical hybrid circuit and the second replica of the pulsed optical signal SP is send to a second optical hybrid circuit, a source emitting an optical signal OS and optical coupler that splits the incoming optical signal OS into two replicas, the first replica of the incoming optical signal OS is sent to the first optical hybrid circuit and the second replica of the incoming optical signal OS is sent to a wavelength recovery device WVLR, whose output is a continuous-waveform optical signal CW at the central wavelength of the incoming optical signal OS, which sends it to the second optical hybrid circuit.

such that the optical signal OS is sampled within the first hybrid circuit and the continuous waveform optical signal CW is sampled in the second hybrid circuit, and a device BDADC comprising balanced photodectors detecting optical signals at the output of the two optical hybrid circuits and an analog/digital converter ADC.

The solution relies on the idea of recovering the wavelength of the unknown input optical signal, then sampling the recovered optical signal CW at the same time, because the modulated input optical signal is also currently being sampled, such that the final results of the sampling are independent of the coherence time of the input optical signal, and also independent of the binary bitrate of the input optical signal.

According to one embodiment, the wavelength recovery device WVLR comprises a tunable optical filter or a system of tunable optical filters.

According to one variant, the tunable optical filter is a MachZender interferometer.

According to another variant, the tunable optical filter is a Fabry-Perrot interferometer.

According to one aspect, a thermal device makes it possible to tune the optical filter.

According to another aspect, an electrical adjustment device makes it possible to tune the optical filter.

According to another embodiment, the wavelength recovery device WVLR further comprises an optical coupler, arranged at the output of the tunable filter, and a photodetector disposed at the output of the optical coupler, such that a portion of the filtered optical signal is detected and restored in the form of an electrical signal used in a feedback loop to tune the tunable filter.

According to yet another embodiment, the wavelength recovery device WVLR further comprises an optical amplifier for amplifying the level of the filtered optical signal.

According to one variant, the optical amplifier is a semiconductor optical amplifier SOA operating within its saturation regime in order to mitigate parasitic modulation on the optical signal at the output of the tunable optical filter.

According to another variant, the wavelength recovery device WVLR comprises a ring resonator.

According to yet another embodiment, the system further comprises a polarization splitter that splits the incoming optical signal into two propagation modes orthogonal to one another.

A further subject matter of the present invention is a method for linear optical sampling of an optical signal OS by means of the system described above, comprising the following steps:

an incoming pulsed optical signal SP is split into two propagation modes orthogonal to one another each propagation mode of the pulsed optical signal SP is split into two replicas, the first replica of the pulsed optical signal SP is sent to a first optical hybrid circuit and the second replica of the pulsed optical signal SP is send to a second optical hybrid circuit, an incoming optical signal OS is split into two propagation modes orthogonal to one another, each propagation mode of the optical signal OS is split into two replicas, the first replica of the optical signal OS is sent to the first optical hybrid circuit and the second replica of the optical signal OS is sent to a wavelength recovery device WVLR, then the continuous signal containing the recovered wavelength is sent to the second optical hybrid circuit, for each propagation mode, the two optical signals departing the first optical hybrid circuit and the two optical signals departing from the second optical hybrid circuit are sent to a BD-ADC device.

A further subject matter of the present invention is a method for coherent detection of an optical signal OS by means of the system described above, comprising the following steps:

an incoming optical signal OS is split into two propagation modes orthogonal to one another, each propagation mode of the optical signal OS is split into two replicas, the first replica of the optical signal OS is sent to an optical hybrid circuit and the second replica of the optical signal OS is sent to a wavelength recovery device WVLR, then the continuous signal containing the recovered wavelength is sent to the optical hybrid circuit, the four optical signals departing the optical hybrid circuit are sent to a BD-ADC device.

This solution is advantageous for optimal linear sampling OLS, with improved flexibility in monitoring advanced-format optical signals, and also a more flexible solution for coherent transmission systems.

The proposed solution is based on recovering the wavelength of the unknown incoming optical signal using resonators that differ from the prior art (NTT, NIST). This wavelength recovery scheme may also be used in all coherent receptors (co-Rx) to replace a tunable laser.

For the scope of optical linear sampling OLS, this new solution does not depend on the binary bitrate of the input optical signal, and it will be able to handle the possible poor quality of the input optical signal. For coherent transmission applications, this solution may replace a tunable CW laser, which makes it possible to limit the optical bandwidth of the system due to the limited tunability of the conventional tunable laser.

BRIEF DESCRIPTION

Figure 2:
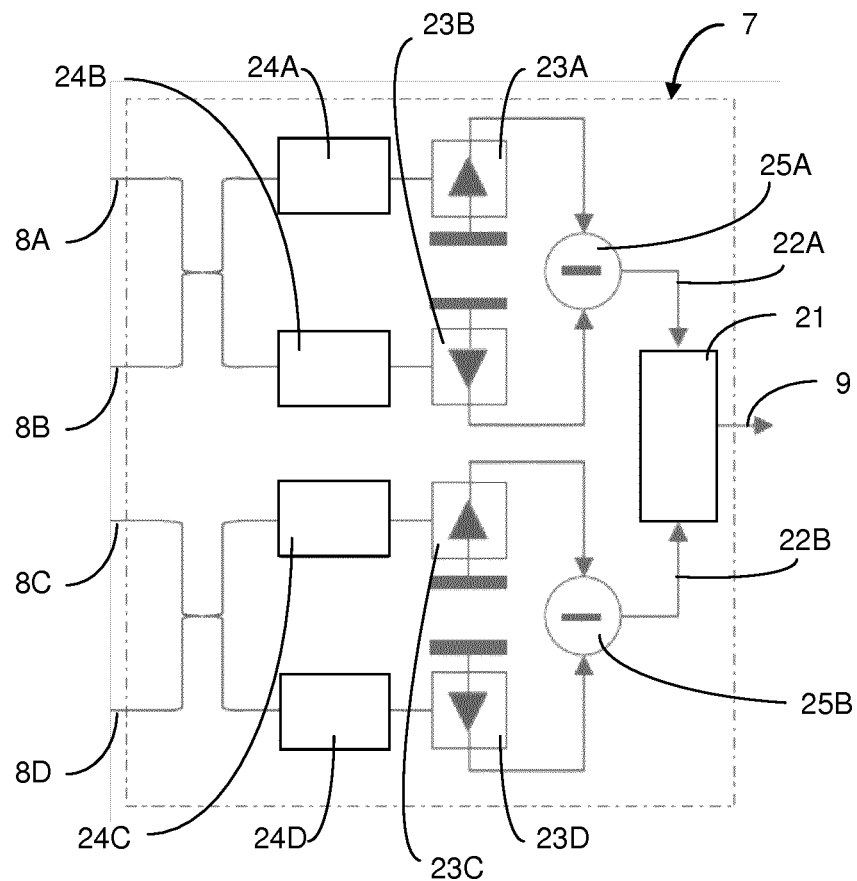
Figure 3:
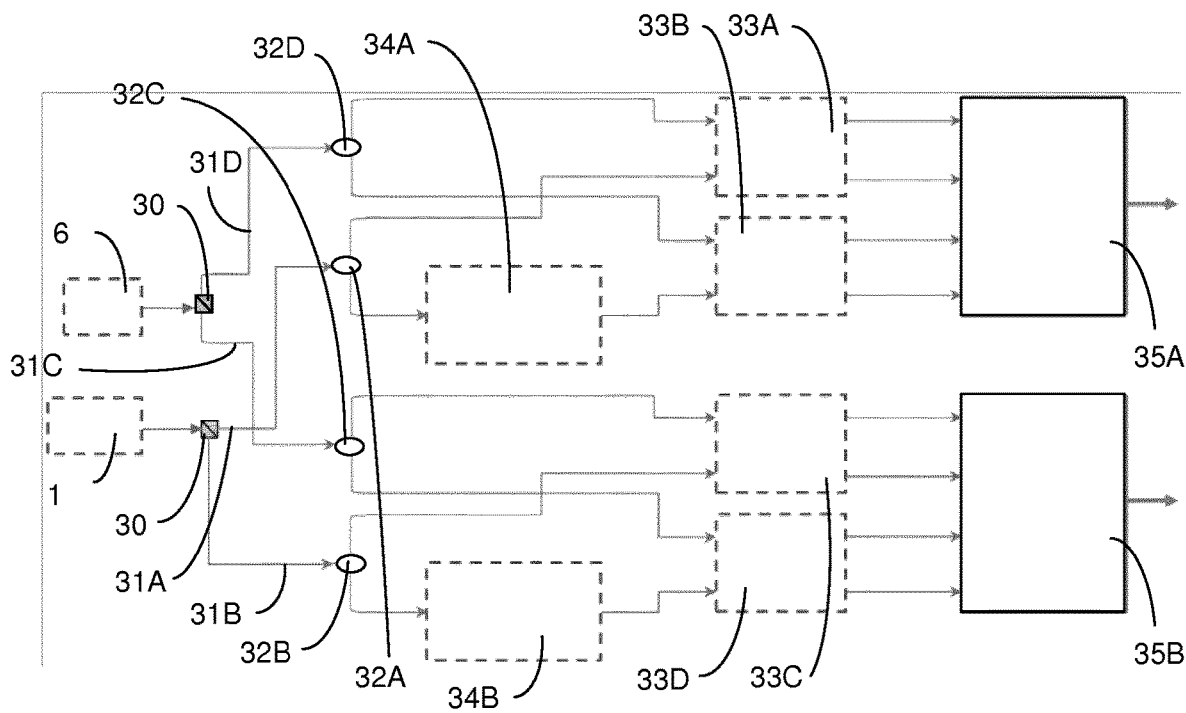
Figure 4:
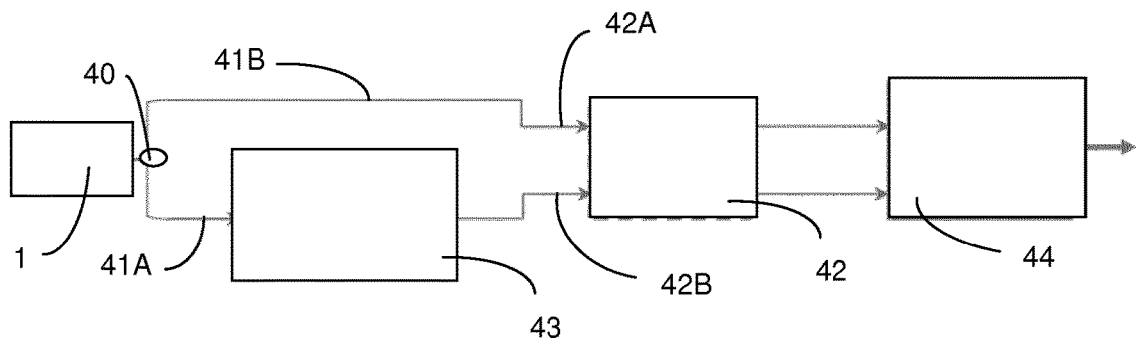
Figure 5:
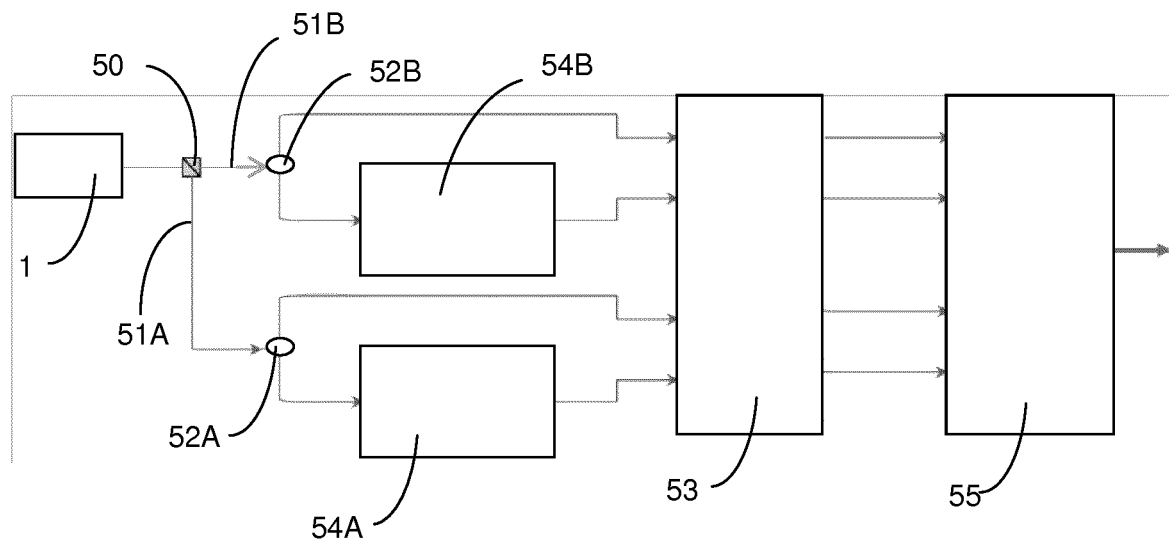
Figure 6:
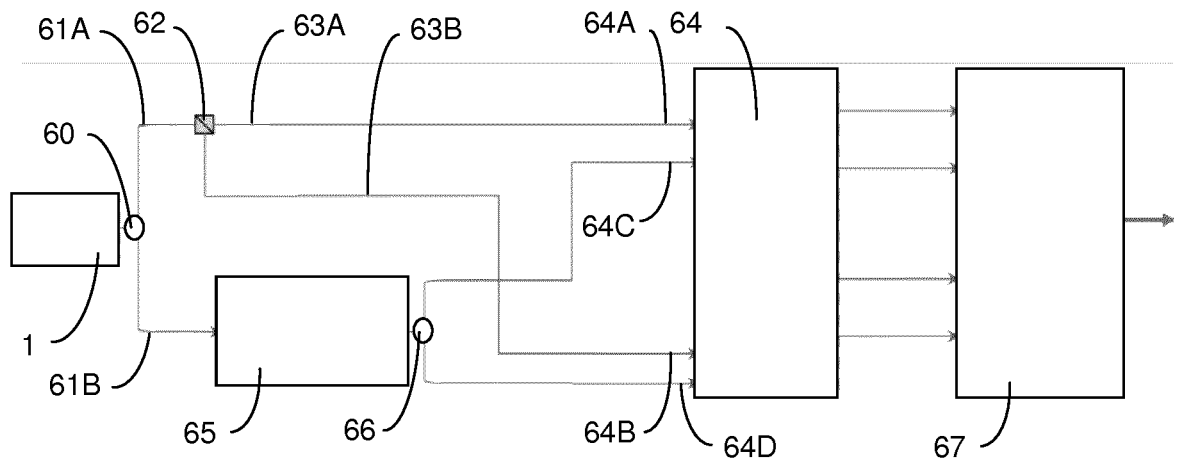
Figure 7:
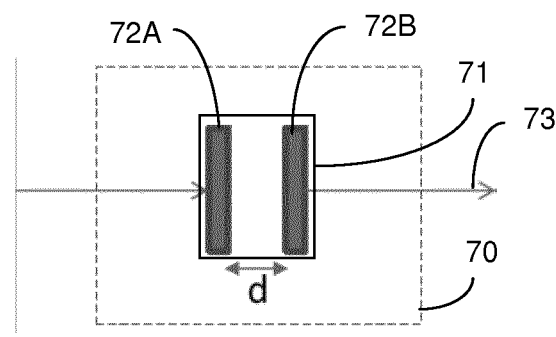
Figure 8:
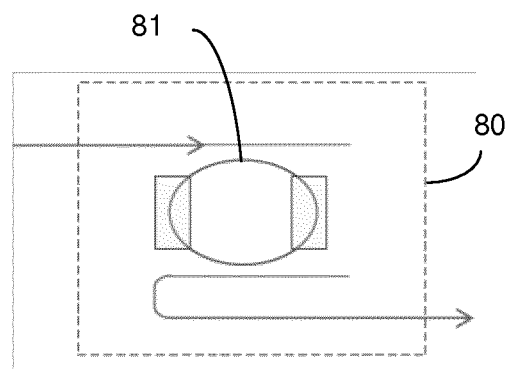
Figure 9:
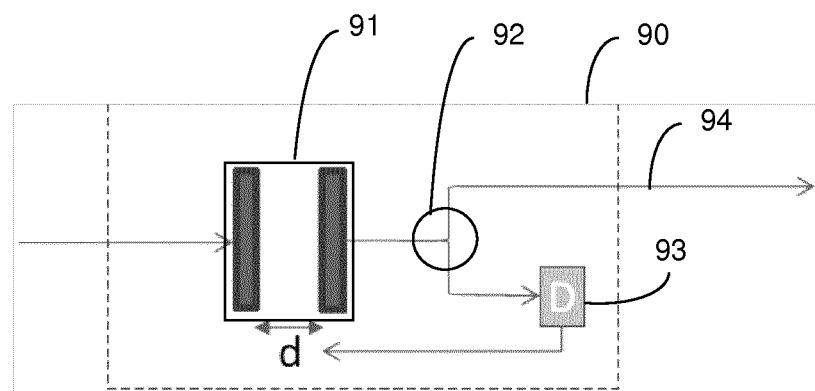
Figure 10:
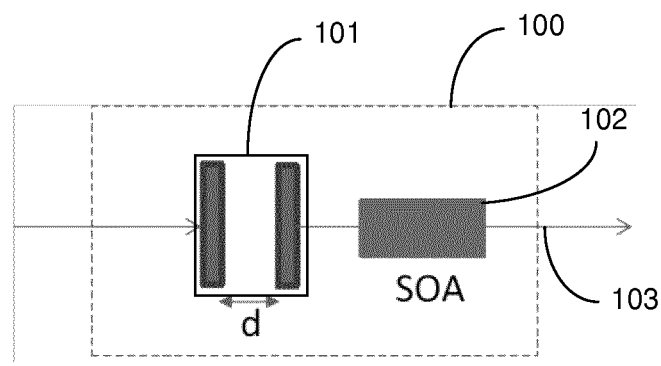

Other characteristics and advantages will become apparent on reading the following description of one construction, given naturally as an illustrative and non-limiting example, and in the attached drawing in which FIG. 1 schematically depicts one partial embodiment of an optical signal coherent detection system, FIG. 2 schematically depicts one embodiment of a device BDADC, FIG. 3 schematically depicts one embodiment of a complete optical signal coherent detection system, FIG. 4 schematically depicts one embodiment of a partial optical signal coherent detection system, FIG. 5 schematically depicts one embodiment of a coherent detection system for both polarizations of an optical signal, FIG. 6 schematically depicts another embodiment of a coherent detection system for both polarizations of an optical signal, FIG. 7 schematically depicts one embodiment of the device for recovering the wavelength of an optical signal comprising a Fabry-Perrot interferometer, FIG. 8 schematically depicts another embodiment of the device for recovering the wavelength of an optical signal comprising a ring interferometer, FIG. 9 schematically depicts yet another embodiment of the device for recovering the wavelength of an optical signal comprising a Fabry-Perrot interferometer and a feedback loop, FIG. 10 schematically depicts yet another embodiment of the device for recovering the wavelength of an optical signal comprising a Fabry-Perrot interferometer and a semiconductor optical amplifier.

DETAILED DESCRIPTION

FIG. 1 depicts one partial embodiment of a system for linear optical sampling of very high-speed complex optical signals OS (phase- and/or amplitude-encoded). In reality, the input optical signal OS propagates using an unknown mode. The incoming optical signal OS is therefore projected into the system using two arbitrary linear propagation modes. In this illustration, a single polarization mode, such as the transverse electric mode TE of the incident vector optical signal OS, is sampled and processed by the optical linear sampling system.

At a first input 1 of the optical linear sampling system, the optical signal OS that carries data is split into two identical replicas by an optical coupler 2A which are sent on two optical paths and is transported by a polarization-maintaining optical fiber PMF 3A, 3B. Here, signal splitting means producing two identical replicas that each have half the power of the incoming signal. A replica of the modulated optical signal that carries data is routed directly to the input port of the first optical hybrid circuit 4A. However, the other replica is sent to a device that enables wavelength recovery WVL-R 5, such as in this case a semiconductor amplifier SOA combined with an optical filter. This is so that, at the output of the WVL-R device 5, a continuous optical signal is collected which no longer contains encoded data, but rather data at the precise wavelength corresponding to the carrier wave of the signal of the OS data. The continuous optical signal departing from the wavelength recovery device WVLR must have a phase relationship with the optical signal entering the device WVLR. The carrier wave is then directed to the input port of a second optical hybrid circuit 4B.

With respect to the prior art, which uses a local oscillator to provide a continuous signal at the same wavelength as the coherent optical signal OS to be detected, that detection system makes it possible to obtain a continuous signal (normally provided by the local oscillator) particularly using a device that enables wavelength recovery WVLR.

At a second input of the system, an SPS source 6 (for "Sampling Source Pulse"), such as a local oscillator OLO or a laser source, emits a sampling-pulse optical signal SP (for "Sampling Pulse"). An optical coupler 2B splits the pulsed optical signal SP into two replicas which are sent on two optical paths and each transported by a polarization-maintaining optical fiber PMF 3C, 3D respectively to one of the input ports of a hybrid optical circuit 4A, 4B.

The operation of a hybrid optical circuit amounts to adding the two incoming optical signals respectively in both of the two input ports, after having altered their phase shift, and of sending the sum of the two signals to two output ports. Both of the two outputs carries a linear combination of the two input signals, which are different from one another. The coefficients used in these linear combinations are complex numbers, ideally with modulus equal to one. If the phase shift between the two series of the aforementioned coefficients is 90°, then that optical hybrid may be called a hybrid 90.

The polarization of the sampling pulse optical signal SP is aligned with that of the data optical signal OS. The alignment method may comprise polarization-maintaining fibers PMF correctly aligned with the connectors to the inputs of the hybrid optical circuits.

A BD-ADC device 7 (for "Balanced Detectors Analog-to-Digital Converter") receives the optical signals as input, coming from the two hybrid optical circuit output ports 4A and 4B, transported by optical fibers PMF 8A, 8B and 8C, 8D respectively. The BD-ADC device 7 combines these four optical signals. At the output 9 of the BD-ADC device 7 of the sampling and detection system, the searched-for information is collected in the form of a complex digital electrical signal relating to the amplitude and phase of the optical signal OS that is pulse-sampled SP and digitized. This information is then recovered in order to be displayed after electronic processing, such as in the form of a constellation diagram or an eye diagram.

FIG. 2 depicts one embodiment of a BD-ADC device 7 which receives as input the optical signals transported by optical fibers PMF 8A-8D coming from hybrid optical circuits 4A and 4B. This BD-ADC device 7 detects a processed coherent optical signal, which is considered an analog signal, then performs the analog-digital conversion, and finally delivers at its output port 9 an electrical signal that corresponds to a level of the analog signal, and therefore the output signal is digital.

The BD-ADC device 7 comprises balanced photodetectors BD 20 and an analog-digital converter ADC 21 with two inputs 22A, 22B. It may be provided that the BD-ADC device 7 also comprises electrical signal comparators emitted by balanced photodetectors 23A, 23B, 23C, 23D. The optical signals transported by optical fibers PMF 8A and 8B are mixed, and pass through optical finely-tuned delay lines FDL 24A, 24B, 24C, 24D introducing a time shift that makes it possible to offset the constant difference in optical path between the signals, in order for those signals to arrive synchronous at the balanced photodetectors BD 23A-23D which are balanced with one another, i.e. they have substantially the same level of percussion response. Balanced photodetectors are known to the person skilled in the art. However, delay lines may be placed after the balanced photodetectors BD 23A-23D, and in this case these are electrical time delay lines, which replace the optical finely-tuned delay lines FDL 24A-24D. Analog electrical signals emitted for each pair of matching photodetectors 23A, 23B or 23C, 23D are respectively sent into an electronic component 25A or 25B, which finds the difference (or subtracts), then those differential amplified electrical signals are respectively directed to input ports 22A, 22B of the analog-digital converter ADC 21, at the output 9 of which an electrical signal is detected carrying the information, the electronic level corresponding to the optical signal OS sampled by the pulses from the pulsed signal SP.

FIG. 3 depicts one embodiment of the complete sampling system for processing a data-carrying input optical signal OS.

At a first input 1 in the sampling system, the optical signal OS is projected onto two arbitrary linear propagation modes, orthogonal to one another. This orthogonality must be understood in its broadest sense, i.e. in its algebraic sense, and is not limited to the direction of the perpendicularity. These propagation modes may, for example, respectively correspond to the transverse magnetic polarization mode TM and the transverse electric polarization mode TE of the vectorial optical signal OS.

The optical signal OS entering the system is projected onto two linear propagation modes using a splitter PBS 30 (for "Polarization Beam Splitter") that makes it possible to split a light wave by projecting it onto two linear, orthogonal polarizations, for example respectively transverse magnetic mode TM and transverse electric mode TE.

The transverse magnetic mode TM of the optical signal OS is collected at the output of the splitter PBS 30 and transported by a polarization-maintaining fiber PMF 31A to an optical coupler 32A that splits the optical signal OS into two replicas. Here, signal splitting means producing two identical replicas that each have half the power of the incoming signal. The first replica of the modulated optical signal that carries data is routed directly to the input port of the first optical hybrid circuit 33A. However, the second replica is sent to a WVL-R device 34A. The WVL-R device 34A erases the data and allows through a continuous signal without encoded data, but at the precise wavelength corresponding to the carrier wave of the data signal OS. The carrier wave is then routed to a second hybrid optical circuit 33B.

The transverse electric mode TE of the optical signal OS, separated from the magnetic transverse mode TM, is collected at the output of the splitter PBS 30 and guided through a polarization-maintaining fiber PMF 31B to an optical coupler 32B that splits the optical signal OS into two replicas. The first replica is directly routed to a third hybrid optical circuit 33C, while the second replica is sent within a device WVL-R 34B that erases the data and allows through a continuous signal without encoded data, but at the precise wavelength corresponding to the carrier wave of the signal of the OS data that is directed to a fourth optical hybrid circuit 33D.

At a second input 6 in the sampling system, a source SPS 6, such as a local oscillator OLO or a laser source, for example, emits a pulsed optical signal SP which is projected onto two linear propagation modes, for instance the transverse magnetic mode TM and the transverse electric mode TE, by means of a splitter PBS 30.

The transverse magnetic mode TM of the pulsed signal SP is collected at the output of the splitter PBS 30 and transported by a polarization-maintaining fiber PMF 31C to an optical coupler 32C that splits the pulsed signal SP into two replicas. A replica is transported by a polarization-maintaining fiber to the fourth hybrid circuit 33D, while the other replica is sent to the third hybrid circuit 33C.

The transverse electric mode TE of the pulsed signal SP, separated from the magnetic transverse mode TM, is collected at the output of the splitter PBS 30 and guided through a polarization-maintaining fiber PMF 31D to an optical coupler 32D that splits the pulsed signal SP into two replicas. A replica is transported by a polarization-maintaining fiber to the second hybrid circuit 33B, while the other replica is sent to the first hybrid circuit 33A.

Each hybrid optical circuit 33A-33D adds the two incoming optical signals respectively in both of its two input ports, after having altered their phase shift, and sends the sum of the two signals to both of its output ports. The four signals coming from the four output ports of the first 33A and second 33B hybrid couplers are routed to the four input ports of a BD-ADC device 35A. The four signals coming from the four output ports of the third 33C and fourth 33D hybrid couplers are routed to the four input ports of another BD-ADC device 35B.

Now we shall consider FIG. 4, which depicts a partial embodiment of a coherent detection system, in that the detection system partially depicted here detects only one of the two orthogonal components of the optical signal OS. In the case of a coherent optical signal OS in which the polarization state is unknown, two detection systems, as depicted, must be coupled and used to completely detect the optical signal OS. Coherent detection can only detect and process an optical signal in a defined polarization state, here for example the detection of transverse electric polarization TE has been depicted.

At the input 1 of the detection system, the data-carrying optical signal OS is divided into two identical replicas by an optical coupler 40. The two replicas are sent respectively on two optical paths, each transported by an optical polarization-maintaining fiber PMF 41A, 41B. A first replica of the optical signal OS is routed directly to an input port 42A of a hybrid optical circuit 42, however the other replica is sent to a WVL-R device 43. At the output of the WVL-R device 43, a continuous signal at the same wavelength as the coherent optical signal OS to be detected is collected, which is routed to the other input port 42B of the hybrid optical circuit 42. The two optical signals respectively entering each of the two input ports 42A and 42B of the hybrid optical circuit 42 are added, and the sum of the two optical signals, after having altered their phase shift, is sent to the two output ports of the hybrid optical circuit 42. The optical signals from the hybrid optical circuit 42 are injected into the balanced photodetectors of the device BD-ADC 44, and the analog electrical signals are converted into discrete levels. At the output of that device BD-ADC 44, the entirety of the coherent signal is found for the transverse electric polarization state TE chosen to be depicted in that FIG. 4.

FIG. 5 depicts one embodiment of a coherent detector, both for the transverse magnetic polarization TM and for the transverse electric polarization TE of the optical signal OS, comprising a step of wavelength recovery, replacing two tunable lasers as local oscillators. FIG. 5 proposes one possible diagram of a complete device that can coherently detect and process both polarization states of a complex data-carrying input optical signal, which is split into two polarization state detected and processed separately in a coherent manner.

A data-carrying complex optical signal OS to be detected, whose polarization state is assumed unknown, is injected at the input 1 of the detection system. A polarization splitter PBS 50 makes it possible to split both of the orthogonal components TM and TE of the complex optical signal OS and send them on two different optical paths.

The transverse magnetic polarization component TM is transported by a polarization-maintaining fiber PMF 51A to an optical coupler 52A that splits the optical signal into two replicas. The first replica of the optical signal is routed directly to a hybrid optical circuit 53, but the second replica is sent into a WVL-R device 54A that erases the data and allows through a continuous signal directed towards the hybrid optical circuit 53.

For its own part, the transverse electric polarization component TE is transported by a polarization-maintaining fiber PMF 51B to another optical coupler 52B that splits the optical signal into two replicas. The first replica of the optical signal is routed directly to a hybrid optical circuit 53, but the second replica is sent into another WVL-R device 54B that erases the data and allows through a continuous signal directed towards the hybrid optical circuit 53.

The hybrid optical circuit 53 has four input ports and four output ports which are configured to process each of the orthogonal polarization states as previously described. The BD-ADC device 55 completes the detection of the complex signal and recombines the information carried on both optical polarization states, thereby reconstructing the initial complex signal.

FIG. 6 depicts another embodiment of a coherent detector, both for the transverse magnetic polarization TM and for the transverse electric polarization TE of the optical signal OS, comprising a step of wavelength recovery, replacing a tunable laser as a local oscillator. FIG. 6 gives one variant of FIG. 5, wherein only one recovery wavelength is necessary, provided that this wavelength recovery function is in this case sensitive to the polarization state of the input optical signal. This diagram may preferentially be made of free-space optics using polarization-insensitive solid components.

A data-carrying complex optical signal OS to be detected, whose polarization state is assumed unknown, is injected at the input 1 of the detection system. At the input 1 of the detection system, the data-carrying optical signal OS is divided into two identical replicas by an optical coupler 60. The two replicas are sent respectively on two optical paths, each transported by an optical polarization-maintaining fiber PMF 61A, 61B.

On the PMF fiber 61A, a polarization splitter PBS 62 makes it possible to split both of the orthogonal components TM and TE of the first replica of the complex optical signal OS and send both of them on two different optical paths. The transverse electric polarization component TE is transported by a polarization-maintaining fiber PMF 63A to an input port 64A of a hybrid optical circuit 64, and the transverse magnetic polarization component TM is transported by a polarization-maintaining fiber PMF 63B to an input port 64B of the hybrid optical circuit 64.

However, the second replica of the complex optical signal OS is sent into a WVL-R device 65 that erases the data and allows through a continuous signal that is split by an optical coupler 66 into two replicas respectively routed to input ports 64C and 64D of the hybrid optical circuit 64.

The hybrid optical circuit 64 has four input ports 64A, 64B, 64C and 64D and four output ports connected to a BD-ADC device 67 which completes the detection of the complex signal.

FIG. 7 schematically depicts one embodiment of a device that enables wavelength recovery 70 comprising a tunable optical filter or a system of tunable optical filters. In the present case, a Fabry-Perot (FP) interferometer 71, sometimes also called a Fabry-Perot filter (FFP), is used, and the adjustment parameter is the thickness d of the FP interferometer. A Mach-Zehnder interferometer or a ring resonator may also be used.

The transmission spectral response of such an FP interferometer 71 is a comb of wavelengths (or frequencies) which are spaced equally apart, and the spectral. period (or spectral distance between two teeth of the comb) is constant and called the free spectral interval (ISL) of the FP interferometer 71. This ISL interval may be adjusted by the distance d separating the two mirrors 72A and 72B constituting the FP interferometer 71.

The resonance wavelengths of the FP interferometer 71 may be set by adjusting the refraction index of the material that fills in the space between the two mirrors 72A and 72B of the FP interferometer 71. This material may, for example, be an electro-optical dielectric material (such as lithium niobate, or LiNbO$_3$), whose refraction index may be modified by varying the intensity of an electrical field that is applied to it. One of the resonance wavelength must then be adjusted to the information-carrying wavelength (or frequency) of the complex optical signal OS, and the interval ISL of the FP interferometer 71 must be adjusted such that none of the spectrum components of the complex optical signal OS travel through the FP interferometer 71. For this reason, only the carrier wavelength (or frequency) of the complex optical signal OS travels through the FP interferometer 71 and is transmitted to the output port 73 of the WVL-R device 70.

The transmitted optical signal is continuous and single-frequency (or monochromatic), which is the goal of the functionality of the wavelength recovery device WVL-R 70. This device WVL-R 70 that makes it possible to recover the wavelength may be constructed from guided waves or open-space propagation waves, the latter case being particularly well-suited to the coherent detector diagram such as the one depicted in FIG. 6.

In the embodiment depicted in FIG. 8, the wavelength recovery device WVL-R 80 uses a ring resonator 81 that carries out the same functionality as the Fabry-Perot (FP) interferometer of FIG. 7 and has a similar transmission spectral response.

Here, the interval ISL is determined by the diameter of the ring of the ring resonator 81. The adjustment parameter of the spectral position of the teeth of the comb is in this case the effective refraction index of the waveguide from which the ring resonator 81 is made. This effect of refraction index of the material that makes up the ring of the ring resonator 81 may be modified by changing the temperature using a thermal device, particularly by placing a temperature-regulating element (a resistance heating element or micro-Peltier element). The effect of refraction index may also be set using an electrical adjustment device, by injecting charge carriers into the material that makes up the ring by means of an electrical current.

These effective refraction index variation techniques are particularly well-suited in the event that the ring resonator 81 is made from a semiconductor substrate (Si, InP or GaAs), and all of the described devices are made from a photonic integrated circuit (PIC). In the event that the waveguides are single-mode optical fibers, the fine-tuning of the positions of the teeth of the comb may either be carried out by a change in temperature, or by a local elongation of the optical fiber under mechanical stress. For example, a piezoelectric ceramic tube can be used, around which a portion of optical fiber forming the ring resonator 81 is wound.

Using one of the embodiments of a ring resonator 81 previously described, it is also possible obtain the wavelength recovery functionality. In the event that the ring resonator 81 is made from a photonic integrated circuit (PIC) and if an effort is made during design to make the ring resonator 81 polarization-insensitive, then the embodiment offered by FIG. 8 is suitable for constructing the coherent detection diagram presented in FIG. 6. This design effort relates in particular to the use of light polarization-insensitive waveguides, particularly waveguides whose cross-section has axial asymmetries (such as square cross-sections), and optical couplers that are also polarization-insensitive.

FIG. 9 depicts another embodiment of the wavelength recovery device WVL-R 90 with a tunable filter, here a Fabry-Perot (FP) interferometer 91, followed by a feedback loop.

An optical coupler 92, arranged at the output of the FP interferometer 91, is used to duplicate the optical signal, in order to sample a portion of the filtered optical signal which is detected by a photodetector D 93, while a copy of the optical signal is directed to the output 94. The photodetector D 93 detects the optical signal and delivers an electrical signal which is compared to an electrical signal of a predetermined level. The result of the comparison is sent to an electromechanical device that controls one of the mirrors of the FP interferometer 91, in order to set the distance d separating the two mirrors. The electrical signal is used in a feedback loop to tune the tunable filter, so that the continuous optical signal CW recovered at the output of the device enabling the recovery of the wavelength WVL-R 90 is maximized.

This embodiment makes it possible to establish a counter-reaction on the free spectral interval ISL of the FP interferometer 91, in order to make the FP interferometer 91 suitable for the bitrate of the complex optical signal to detect. This is because the free spectral interval ISL must not be a multiple of the bitrate in order to block the spectral components of the optical signal which must be recovered in wavelengths. The control system Is designed to block all spectral components of the complex optical signal, other than the carrier of the optical signal. Prior measurements of the device are needed to determine the predetermined levels to which the optical signal detected by the photodetector D 93 may be compared. The electronic circuit reflecting the comparison algorithm, as well as the control and mechanical actuation system for the mirrors, are not depicted in FIG. 9. This embodiment may advantageously be adapted and constructed from the ring resonator of FIG. 8.

FIG. 10 further depicts another embodiment of the wavelength recovery device WVL-R 100 with a Fabry-Perot (FP) interferometer 101 combined with an optical amplifier such as an EDFA (Erbium Doped Fiber Amplifier) or an SOA 102 (Semiconductor Optical Amplifier) operating within its saturation regime. This combination has the benefit of eliminating the effect of shaping the optical signal whose wavelength was recovered, which means that the optical output signal will have its residual modulation contrast reduced by the optical amplifier.

Here, a semiconductor optical amplifier SOA 102 is placed on the output path of the FP interferometer 101. The SOA amplifier 102 is used in its saturation regime in order to minimize the contrast of the optical signal at the output of the FP interferometer 101. This is because, in cases where the FP interferometer 101 is not properly adjusted or some harmonics of the modulated optical signal get through the FP interferometer 101 anyway, the output optical signal of the FP interferometer 101 is not perfectly well-known but has a low parasitic modulation. The SOA amplifier 102 in the saturation regime then makes it possible to minimize these parasitic modulations. This embodiment using an SOA amplifier may advantageously be applied in the event that a ring resonator is used in place of the FP interferometer 101. A combination of a control system (see FIG. 9) and the use of an SOA amplifier (see FIG. 10) is also possible for carrying out the wavelength recovery feature.

The invention claimed is:

1. A system for optical linear sampling and coherent detection of an optical signal comprising
a source emitting a pulsed optical signal and an optical coupler that splits the pulsed optical signal into two replicas, wherein the first replica of the pulsed optical signal is sent to a first optical hybrid circuit and the second replica of the pulsed optical signal is sent to a second optical hybrid circuit, a source emitting the optical signal and optical coupler that splits the incoming optical signal into two replicas, wherein the first replica of the incoming optical signal is sent to the first optical hybrid circuit and the second replica of the incoming optical signal is sent to a wavelength recovery device, whose output is a continuous-waveform optical signal at the central wavelength of the incoming optical signal, which sends it to the second Optical hybrid circuit such that the optical signal is sampled within the first hybrid circuit and the continuous waveform optical signal is sampled in the second hybrid circuit, and a detection device comprising balanced photodetectors detecting optical signals at the output of the two optical hybrid circuits and an analog/digital converter.

2. The system according to claim 1, wherein the wavelength recovery device comprises a tunable optical filter or a system of tunable optical filters.

3. The system according to claim 2, wherein the tunable optical filter is a MachZender interferometer.

4. The system according to claim 2, wherein the tunable optical filter is a Fabry-Perrot interferometer.

5. The system according to claim 2, wherein a thermal device makes it possible to tune the optical filter.

6. The system according to claim 2, wherein an electrical adjustment device makes it possible to tune the optical filter.

7. The system according to claim 2, wherein the wavelength recovery device further comprises an optical coupler, arranged at the output of the tunable filter, and a photodetector disposed at the output of the optical coupler, such that a portion of the filtered optical signal is detected and restored in the form of an electrical signal used in a feedback loop to tune the tunable filter.

8. The system according to claim 2, wherein the wavelength recovery device further comprises an optical amplifier for amplifying the level of the filtered optical signal.

9. The system according to claim 8, wherein the optical amplifier is a semiconductor optical amplifier operating within its saturation regime in order to mitigate parasitic modulation on the optical signal at the output of the tunable optical filter.

10. The system according to claim 1, wherein the wavelength recovery device comprises a ring resonator.

11. The system according to claim 1, wherein the system further comprises a polarization splitter that splits the incoming optical signal into two propagation modes orthogonal to one another.

12. A method for optical linear sampling of an optical signal comprising:

an incoming pulsed optical signal is split into two propagation modes orthogonal to one another, each propagation mode of the pulsed optical signal is split into two replicas, the first replica of the pulsed optical signal is sent to a first optical hybrid circuit and the second replica of the pulsed optical signal is sent to a second optical hybrid circuit, the incoming optical signal is split into two propagation modes orthogonal to one another, each propagation mode of the optical signal is split into two replicas, the first replica of the optical signal is sent to the first optical hybrid circuit and the second replica of the optical signal is sent to a wavelength recovery device, then the continuous signal containing the recovered wavelength is sent to the second optical hybrid circuit, and for each propagation mode, the two optical signals departing the first optical hybrid circuit and the two optical signals departing from the second optical hybrid circuit are sent to a detection device comprising balanced photodetectors detecting optical signals at the output of the two optical hybrid circuits and an analog/digital converter.

\* \* \* \* \*